United States Patent
Gagel

(10) Patent No.: US 11,215,425 B2
(45) Date of Patent: Jan. 4, 2022

(54) METHOD FOR DETERMINING CHARACTERISTIC-CURVE CORRECTION FACTORS OF A MATRIX DETECTOR THAT IMAGES IN THE INFRARED SPECTRAL RANGE, METHOD FOR CONTROLLING A GUIDED MISSILE AND GUIDED MISSILE

(71) Applicant: DIEHL DEFENCE GMBH & CO. KG, Ueberlingen (DE)

(72) Inventor: Florian Gagel, Uhldingen-Muehlhofen (DE)

(73) Assignee: Diehl Defence Gmbh & Co. KG, Ueberlingen (DE)

( * ) Notice: Subject to any disclaimer, the term of this patent is extended or adjusted under 35 U.S.C. 154(b) by 349 days.

(21) Appl. No.: 16/270,637

(22) Filed: Feb. 8, 2019

(65) Prior Publication Data

US 2019/0249956 A1 Aug. 15, 2019

(30) Foreign Application Priority Data

Feb. 10, 2018 (DE) .......................... 102018001076.8

(51) Int. Cl.
*G01J 5/00* (2006.01)
*F41G 7/22* (2006.01)
(Continued)

(52) U.S. Cl.
CPC ............ *F41G 7/2253* (2013.01); *F41G 7/001* (2013.01); *F41G 7/007* (2013.01); *F41G 7/2293* (2013.01);
(Continued)

(58) Field of Classification Search
CPC ........ F41G 7/2253; F41G 7/001; F41G 7/007; F41G 7/2293; G01J 5/00; G01J 5/22;
(Continued)

(56) References Cited

U.S. PATENT DOCUMENTS

| 5,420,421 A | 5/1995 | Lindgren et al. |
| 6,028,309 A | 2/2000 | Parrish et al. |

(Continued)

FOREIGN PATENT DOCUMENTS

| DE | 69830731 T2 | 5/2006 |
| EP | 1471729 A2 | 10/2004 |

(Continued)

OTHER PUBLICATIONS

Jun et al., "Robust face detection using local gradient patterns and evidence accumulation", 2012, Pattern Recognition, vol. 45, pp. 3304-3316. (Year: 2012).*

(Continued)

*Primary Examiner* — Kiho Kim
(74) *Attorney, Agent, or Firm* — Laurence A. Greenberg; Werner H. Stemer; Ralph E. Locher

(57) ABSTRACT

The invention relates to a method for determining characteristic-curve correction factors a matrix detector that images in the infrared spectral range. A good image correction can be obtained by virtue of an area of homogeneous temperature being recorded at two different temperatures by the matrix detector, there being two images with different integration times for each temperature. A signal gradient over the integration time is established for each of the pixels from the four pixel values at the two temperatures in each case and the gain being established from the difference of the signal gradients and characteristic-curve correction factors for the gain being stored.

14 Claims, 2 Drawing Sheets

(51) Int. Cl.
- *H04N 5/33* (2006.01)
- *H04N 5/357* (2011.01)
- *H04N 17/00* (2006.01)
- *F41G 7/00* (2006.01)
- *G01S 3/78* (2006.01)
- *G01J 5/22* (2006.01)

(52) U.S. Cl.
CPC . *G01J 5/00* (2013.01); *G01J 5/22* (2013.01); *G01S 3/7803* (2013.01); *H04N 5/33* (2013.01); *H04N 5/357* (2013.01); *H04N 17/002* (2013.01); *G01J 2005/0077* (2013.01)

(58) Field of Classification Search
CPC ............ G01J 2005/0077; H04N 5/357; H04N 17/002; H04N 5/33; G01S 3/7803
See application file for complete search history.

(56) References Cited

U.S. PATENT DOCUMENTS

| | | | |
|---|---|---|---|
| 7,391,925 | B2 | 6/2008 | Chen et al. |
| 7,443,431 | B2 | 10/2008 | Kelly et al. |
| 8,426,820 | B2 | 4/2013 | Barenz |
| 9,442,020 | B2 | 9/2016 | Durand et al. |
| 2009/0079854 | A1* | 3/2009 | Mangoubi ............ H04N 5/3656 348/251 |
| 2010/0329583 | A1* | 12/2010 | Whiteside ................ H04N 5/33 382/260 |
| 2015/0085134 | A1 | 3/2015 | Novotny et al. |
| 2015/0125092 | A1* | 5/2015 | Zhuo ........................ G06T 5/002 382/275 |

FOREIGN PATENT DOCUMENTS

| | | |
|---|---|---|
| EP | 2109309 A2 | 10/2009 |
| FR | 3000789 A1 | 7/2014 |

OTHER PUBLICATIONS

Arnulf Wallrabe: "Nachtsicht-technik—Infrarot-Sensorik: physikalische Grundlagen, Aufbau, Konstruktion und Anwendungen von Wärmebildgeräten", Vieweg, 1st Edition, Aug. 2001, ISBN 978-3-663-08101-2, DOI 10.1007/978-3663-08100-5, ISBN 978-3-663-08100-5 (e-Book).

Swierkowski et al., "Emissive infrared projector temperature resolution limiting factors", Technologies for Synthetic Environments: Hardware-in-the-Loop Testing IX, Proceedings of SPIE vol. 5408, 2004, doi:10.1117/12.542937.

Nesher et al., "Advanced IR Detector Design at SCD: from D3C to ABCS", Quantum Sensing and Nanophotonic Devices, Proceedings of SPIE vol. 5359, 2004, doi:10.1117/12.531401.

* cited by examiner

METHOD FOR DETERMINING CHARACTERISTIC-CURVE CORRECTION FACTORS OF A MATRIX DETECTOR THAT IMAGES IN THE INFRARED SPECTRAL RANGE, METHOD FOR CONTROLLING A GUIDED MISSILE AND GUIDED MISSILE

CROSS-REFERENCE TO RELATED APPLICATION

This application claims the priority, under 35 U.S.C. § 119, of German application DE 10 2018 001 076.8, filed Feb. 10, 2018; the prior application is herewith incorporated by reference in its entirety.

BACKGROUND OF THE INVENTION

Field of the Invention

The invention relates to a method for determining characteristic-curve correction factors of a matrix detector which images in the infrared spectral range.

Vehicles under automated control may comprise a matrix detector, on which a region of the surrounding object scene is imaged. The image contents are evaluated, and the vehicle is controlled on the basis of the evaluation results, for example guided around an identified obstacle or guided to an identified target. However, a problem arising in infrared images, in particular, is that the individual detector elements of the matrix detector have significant image deviations relative to one another due to the manufacturing process, and so clear structures are visible, even in an image without imaged objects. Such image artefacts can lead to an incorrect control of the vehicle and should therefore be corrected to the best possible extent.

Such a correction of infrared detectors is known as a so-called nonuniformity correction/compensation (NUC). However, depending on how the matrix detector is produced, significant image artefacts remain even after such a correction, the image artefacts interfering with a reliable control of the vehicle.

SUMMARY OF THE INVENTION

Therefore, it is an object of the invention to specify an improved method for correcting characteristics of a matrix detector that images in the infrared spectral range.

This object is achieved by the method set forth at the outset, in which, according to the invention, an area of homogeneous temperature is recorded at two different temperatures by the matrix detector, there being two images with different integration times for each temperature, and a signal gradient over the integration time is established for each of the pixels from the four pixel values at the two temperatures in each case and the gain is established from the difference of the signal gradients and characteristic-curve correction factors for the gain are stored.

A matrix detector contains a multiplicity of detector elements that are arranged in two dimensions in relation to one another, the detector elements each being able to output a pixel value as a signal, the pixel value increasing over the integration time and also being referred to as signal below. The signals of a plurality of detector elements can also be combined to form a single pixel value, which is why a distinction is made below between detector element and pixel. The signal depends, firstly, on the photon flux $\Phi$ striking a detector element and, secondly, on the detector element properties which determine the conversion of the photon flux into the signal.

The signal can be composed from three components: the signal offset $\omega$, also referred to as offset, the gain $\gamma$ and the dark current $\theta$. While the signal offset $\omega$ is independent of photon flux $\Phi$ and integration time t, the signal increases in integration-time-dependent fashion as a result of the gain $\gamma$ and the dark current $\theta$, with, however, only the gain $\gamma$ depending on the photon flux $\Phi$.

In summary, the following relation arises:

$$s_i = \omega_i + t(\gamma_i f(\Phi_i) + \theta_i)$$

where
$s_i$: signal of the detector element i,
$\Phi_i$: photon flux,
$\omega_i$: signal offset of the detector element i,
$\gamma_i$: gain of the detector element I, and
$\theta_i$: dark current of the detector i.

In order now to arrive at a corrected signal S, the measured value should be corrected by the characteristic-curve correction factors for the signal offset, gain and dark current such that the following relation arises:

$$S_i = \Omega_i + t(\Gamma_i f(\Phi_i) + \Theta_i)$$

where
$S_i$: corrected signal of the detector element i,
$\Omega_i$: characteristic-curve correction factor for the signal offset of the detector element i,
$\Gamma_i$: characteristic-curve correction factor for the gain of the detector element I, and
$\Theta_i$: characteristic-curve correction factor for the dark current of the detector element i.

The gain and the characteristic-curve correction factor for the gain are equivalent terms since the knowledge about the gain for a pixel contains the knowledge about the characteristic-curve correction factor of the gain for these pixels, which emerges from the ratio of the gain of the pixel to a reference value, which can be the same for all pixels. Therefore, the terms of gain and characteristic-curve correction factor for the gain are used synonymously below. The same applies to the signal offset and the dark current. Moreover, the index i is dispensed with below for reasons of clarity, with the characteristic-curve correction factors expediently being established for each pixel. If a pixel is present for each detector element, the characteristic-curve correction factors are expediently established for each detector element.

While it is relatively simple to establish the signal offset or the characteristic-curve correction factors thereof for each pixel, determining the gain is more complicated. However, the invention provides a simple method for pixel-by-pixel determination of the characteristic-curve correction factors of the gain such that the signal of the pixels or of the detector elements can have a very good correlation therewith. As a result, the overall image becomes substantially more homogeneous, particularly if, optionally, the signal offset is additionally corrected, and the vehicle can be controlled more reliably.

The area with a homogeneous temperature emits at the same temperature or with the same temperature distribution in each recorded region; here, use can be made of a spectrally homogeneous blackbody emitter, the temperature of which lies in the infrared spectral range. All signals of the pixels or detector elements should be the same when recording the area with a homogeneous temperature. In reality, this is not the case. In this respect, it is possible to use deviations from a common reference value, for example the mean value of the gain over all pixels, for the purposes of determining the characteristic-curve correction factors pixel-by-pixel. Deviations of the gradients or gradient differences from the mean value of the gradients or differences can be used as characteristic-curve correction factors for the gain. Expediently, the characteristic-curve correction factors for the gain are determined in a building, for example in a laboratory, and prior to deployment of the matrix detector in a vehicle. The characteristic-curve correction factors for the signal offset may also only be determined during a deployment of the detector in the vehicle.

The integration times are different for the two images of the same temperature, wherein use can be made of the same integration time pairs for the different temperatures. It is just as easily possible to choose three or four different integration times, and so each of the four images was recorded with an individual integration time.

Two signals with different strengths are available for each temperature, it being possible to place a linear function there through depending on the integration time. In this case, the signal gradient is constant. Gradient difference can be established, for example in the form of a value, from the two different gradients for the two temperatures. A reference value for all pixels can be established in the same way, for example a mean value of all signal gradients or gradient differences, a median or any other suitable value. The difference between the pixel-individual gradient difference and the gradient reference value can be stored as a characteristic-curve correction factor. Expediently, storing is implemented by saving to a memory which is expediently accessible to image processing electronics for correcting the images recorded by the matrix detector.

As mentioned, in an advantageous embodiment of the invention, it is expedient for the characteristic-curve correction factors for the signal offset for each of the pixels to be established from at least two pixel values assigned to one of the temperatures. By way of example, the signal value emerging from the gradient at the integration time value of t=0 is taken. Expediently, the signal offset is subtracted from the pixel values and the gain is established from the pixel values remaining thus.

The temperature homogeneity of the imaged area of the blackbody emitter is of substantial importance to the quality of the signal correction. It is therefore expedient for the blackbody emitter or the area with a homogeneous temperature to be imaged in a building in order to obtain the best possible control over the imaged area. Accordingly, it is advantageous if the characteristic-curve correction factors for the gain are determined while the matrix detector is situated in a building. The characteristic-curve correction factors for the signal offset, too, can be determined in the building. However, the signal offset may be subject to significant migration over a period of days, weeks or months, and so it deviates significantly from the laboratory values during a subsequent deployment. However, since the signal offset is dependent on neither the temperature nor the integration time, it can also be determined during a subsequent deployment of the matrix detector in a vehicle, for example in a guided missile. The characteristic curves of the detector elements assigned to the pixels can then be corrected during the deployment using the characteristic-curve correction factors for the signal offset. Naturally, it is also possible to already establish and save the signal offset under laboratory conditions. Then, an offset correction can be established during deployment, the offset correction complementing or overwriting the laboratory-related characteristic-curve correction factors during the deployment.

In the case of a temporally continuous radiant flux of the area with a homogeneous temperature, the images with different integration times can be recorded in temporal proximity of one another to a greater or lesser extent. However, should the signal offset be established during the deployment, an object scene of the surroundings with presumably greater fluctuations will be imaged on the matrix detector. In this situation, in particular, it is very advantageous if the two images with different integration times are recorded immediately in succession. Here, immediately can mean that no further images, or at most three further images, recorded by the matrix detector lie between the two images. By way of example, alternating images with different integration times are continuously recorded by the matrix detector.

An even more in-depth image correction can be achieved if a dark current is determined for each of the pixels using at least the pixel values assigned to one of the temperatures. The characteristic curves of the detector elements assigned to the pixels can now be corrected using the characteristic-curve correction factors of the dark current.

The dark current, too, is dependent on the integration time, and so the signal gradients are formed, first, from the constant component of the dark current and, second, from a photon-flux-dependent or temperature-dependent component of the gain. Only the gain reacts to changes in the scene. A problem here is that although there is a theoretic dependence on the blackbody temperature for the photon flux, so many variables are included in the overall detector response or the signal of the individual detector elements that there is no simple model for the dependence of the signal as a function of the photon flux. All that is certain is the monotonic property of the temperature, with the signal thus increasing with increasing temperature. Accordingly, it is difficult to separate gain from dark current. However, on account of its insensitivity to temperature changes, the dark current only plays the role of an offset in the gradient images; i.e., it is constant with temperature. In this respect, using the gradients allows the dark current to be subtracted as a constant that is only dependent on the individual pixels.

In this respect, one of the signal gradients or a summation of both signal gradients can be used as dark current. In this context, a summation is a variable containing the sum or the difference of the two signal gradients, for example the mean value of the two signal gradients. In this respect, the deviation of the mean value of the two signal gradients of a pixel or detector element from the mean value of the signal gradient difference over all pixels or detector elements can be used as characteristic-curve correction factor for the dark current. In general, instead of the mean value, any other suitable variable can also be used, for example a median or only one of the two signal gradients.

In a further advantageous configuration of the invention, the gain is determined from the difference of the two signal gradients. The difference in the two signal gradients precisely provides the photon-flux-dependent component of the signal, and so the latter can be used as gain.

Accordingly, the characteristic-curve correction factors for the gain can be formed from the mean difference of the signal gradients divided by the pixel-individual differences in the signal gradient. Thus, the gradient difference divided by the mean gradient difference over all pixels or detector elements can be used for each pixel. Instead of the mean difference, any other variable formed from the difference over all pixels can be used, for example the median or any other suitable variable.

In respect of the sequence of determining the individual characteristic-curve correction factors, it is advantageous if the characteristic-curve correction factors for the signal offset are determined first, followed by those for the dark current and lastly those for the gain. Determining the characteristic-curve correction factors for the dark current can contain the use of the characteristic-curve correction factors for the signal offset. Likewise, the characteristic-curve correction factors for the gain can be determined using the characteristic-curve correction factors for the dark current.

A more accurate correction of the signal offset can be achieved if the characteristic-curve correction factors of the signal offset are determined from the image values of both recording temperatures, for example by virtue of each being formed as a mean value from the two signal offsets. In reality, the two gradient lines will not cross exactly at the temporal origin of the integration. Therefore, the use of the mean value of both signal offsets will lead to a correction improvement over all pixels.

The two different temperatures of the emitter with a homogeneous temperature are expediently chosen in such a way that the temperature range there between at least predominantly covers the main detection spectral range of the matrix detector. Temperatures between 0° C. and 150° C., particularly between 30° C. and 120° C., are particularly expedient. The further temperatures or infrared colours of the matrix detector can be corrected in such a way that the characteristic-curve correction factors for such temperatures are interpolated from the two temperatures. Below, the interpolation also contains an extrapolation. The interpolation and extrapolation can be a dependence of the radiation flux on the temperature, either linearly or using a function.

The detector temperature of the matrix detector forms a further independent variable of the characteristic-curve correction factors. Thus, these are dependent on the detector temperature. In this respect, it is advantageous if the detector temperature of the matrix detector is determined and the characteristic-curve correction factors are determined as a function of the detector temperature. Expediently, the characteristic-curve correction factors are established for a plurality of different detector temperatures. Then, the characteristic-curve correction factors for other detector temperatures can be formed by interpolation or by extrapolation.

Moreover, the invention is directed to a method for controlling a guided missile, in which the characteristic-curve correction factors are established with the aforementioned method according to the invention, in particular. Advantageously, the characteristic-curve correction factors for the gain and, in particular, for the dark current as well are determined prior to the deployment of the guided missile, expediently by virtue of the matrix detector lying within a building. The characteristic-curve correction factors for the offset can be determined or corrected during a subsequent deployment.

The guided missile containing the matrix detector in its seeker head can be brought to a deployment site and can be launched there. Two images of the surroundings can be recorded with different integration times by the matrix detector prior to or after launch, and a signal offset can be established for each pixel from the two image values. On account of the greatly fluctuating scene, it is expedient if the two images with different integration times are recorded directly in succession. Now, a signal offset or the characteristic-curve correction factors for the signal offset can be established for each of the pixels from the two image values. The images can be corrected in a further step using the characteristic-curve correction factors for the signal offset and gain. The guided missile can be controlled using the images that were at least corrected in respect of the gain.

In order to obtain swift target tracking or control of the guided missile, it is advantageous if the two images with different integration times are already recorded while the matrix detector is cooled. By way of example, cooling is implemented to establish a readiness of the matrix detector. In this way, the signal offset or its characteristic lines can already be determined when the matrix detector is not yet fully operational.

Moreover, the invention is directed to a guided missile with a seeker head containing a matrix detector, a data memory and a control unit for controlling a deployment flight. In order to reliably correct images for use in the guided missile controller, the data memory, according to the invention, contains characteristic-curve correction factors for the gain of the detector elements of the matrix detector. Expediently, these were obtained according to the above-described method according to the invention.

Independently of the method used to establish the characteristic-curve correction factors for the gain, the dark current and/or the signal offset of the detector elements of the matrix detector, it is advantageous if the control unit is prepared to determine characteristic-curve correction factors for the signal offset of the detector elements of the matrix detector on the basis of two scene images with different integration times recorded directly in succession during a deployment. As a result of this, image artefacts on account of the signal offset fluctuating in the meantime can be kept low.

The description of advantageous configurations of the invention provided above contains numerous features, some of which are reproduced in combination as a plurality in a few dependent claims. However, expediently, the features may also be considered individually and combined to form expedient further combinations, in particular in the case of dependency references of claims, and so an individual feature of a dependent claim is combinable with a single feature, a number of features or all features of another dependent claim. Moreover, these features are combinable, respectively on their own and in any suitable combination, both with the method according to the invention and with the apparatus according to the invention in accordance with the independent claims. Thus, method features should also be considered to be phrased in substantive fashion as properties of the corresponding apparatus unit and functional apparatus features should also be considered to be phrased as corresponding method features.

The above-described properties, features and advantages of this invention and the manner in which they are achieved will become clearer and more easily understandable in conjunction with the following description of the exemplary embodiments, which are explained in more detail in conjunction with the drawings. The exemplary embodiments serve to explain the invention and do not restrict the invention to the combination of features specified therein, not even in relation to functional features. Moreover, features of each exemplary embodiment which are suitable therefore may also be explicitly considered in isolation, may be removed from an exemplary embodiment, introduced into another exemplary embodiment for the purposes of complementing the latter and/or be combined with any one of the claims.

Other features which are considered as characteristic for the invention are set forth in the appended claims.

Although the invention is illustrated and described herein as embodied in a method for determining characteristic-curve correction factors of a matrix detector that images in the infrared spectral range, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
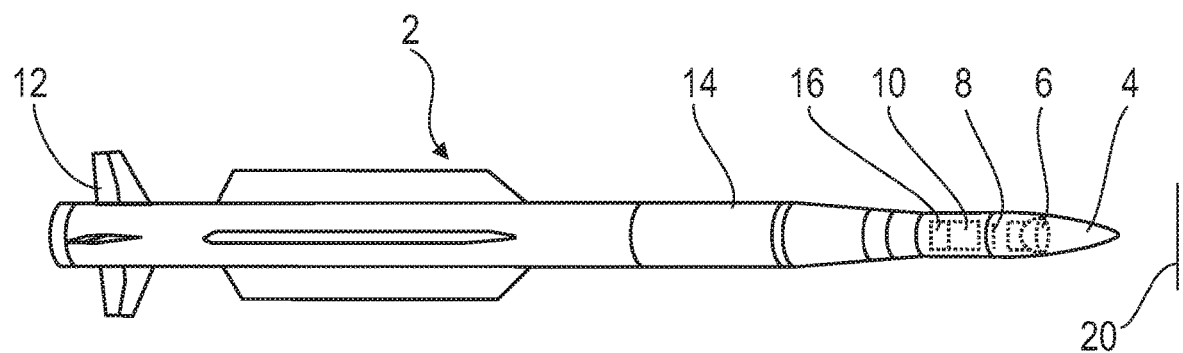
FIG. 1 is an illustration of a guided missile with a matrix detector in a seeker head.

Referring now to the figures of the drawings in detail and first, particularly to FIG. 1 thereof, there is shown a guided missile 2 having a seeker head 4, which has an optical unit 6 that images a surrounding scenery in front of the guided missile 2 onto a matrix detector 8. The matrix detector 8 is a matrix detector that is sensitive to the infrared spectral range and it contains m×n detector elements, which are arranged in rows and columns, in hexagonal fashion or in any other way over an area, on which the optical unit 6 images. The matrix detector is of the focal plane array (FPA) type. The signals of the detector elements of the matrix detector 8 are evaluated by a control unit 10, which recognize an object as such from the image contents of the images produced by the matrix detector 8. The object can be an obstacle or a target, with the control unit 10 guiding the flight of the guided missile 2 around the obstacle or towards the target. By way of example, control is implemented by means of deflectable fins 12, which steer the flight of the guided missile 2 and, for example, allow an active body 14 to be brought to the target.

For production reasons, the signals of the individual detector elements of the matrix detector 8 are inhomogeneous in relation to one another in terms of the signal. Therefore, they supply a different signal when exactly the same photon flux strikes. This leads to image aberrations, which can make interpreting the object significantly more difficult, particularly if the latter still is far away from the guided missile 2. For the purposes of correcting such artefacts, characteristic-curve correction factors for each detector element of the matrix detector 8 can be stored in a data memory 16 that is accessible to the control unit 10. The signal of the individual detector elements now can be corrected therewith, and so the image aberrations are reduced.

Figure 2:
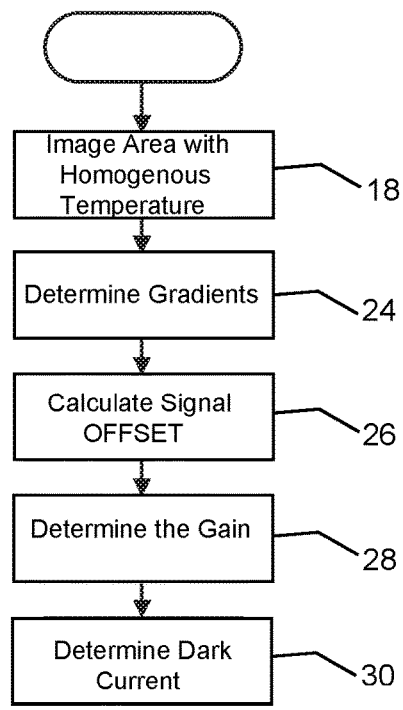
FIG. 2 is a flowchart for determining characteristic-curve correction factors.

FIG. 2 shows a flowchart for determining such characteristic-curve correction factors. To this end, an area 20 of homogeneous temperature, for example a blackbody emitter in a building, is imaged on the matrix detector 8 in a first method step 18. In FIG. 1, the area 20 is only illustrated schematically. For imaging purposes, the building needs to contain only the seeker head 4 or only the matrix detector 8 with a suitable optical unit 6 and an evaluation unit.

Subsequently, two images of this area 20 are recorded, with the images being recorded with different integration times. Subsequently, a further area or the same area 20 with a different homogeneous temperature is imaged on the matrix detector 8 and two images with different integration times are recorded again.

Figure 4:
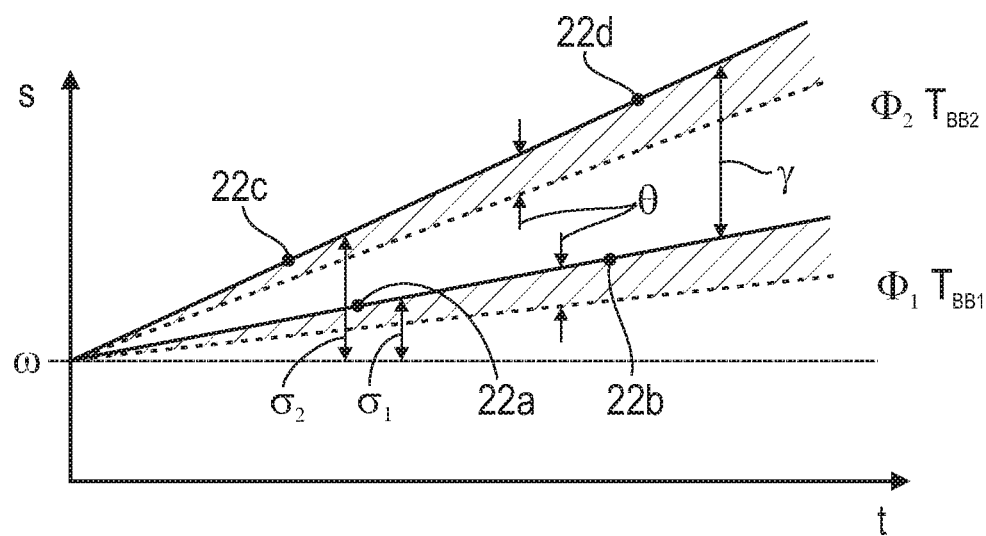
FIG. 4 is a diagram showing plotting detector element signals against integration time.

A result of this method step as illustrated schematically in FIG. 4. FIG. 4 shows a signal s that is triggered by photon flux Φ striking the detector element, plotted against the integration time t of the recorded image. The four measurement points 22a to 22d which the detector element has output as signals for the four images are illustrated. The first image, which was recorded at a blackbody temperature $T_{BB1}$, supplies the two measurement points 22a and 22b. The two further images, which were recorded at a higher blackbody temperature $T_{BB2}$, supply the measurement points 22c and 22d. The integration time pairs for the two blackbody temperatures $T_{BB}$ may be equal; however, this is not mandatory. In FIG. 4, the integration times t of all four images are different from one another.

The signal s is substantially composed from three signal components: the signal offset ω, the signal gain or simply gain γ, and the dark current θ. The signal offset ω is constant over the integration time t, as illustrated in FIG. 4 by the straight line at ω. The gain γ and the dark current θ are dependent on the integration time. While the dark current θ grows linearly with the integration time t, it is independent of the temperature $T_{BB}$ of the recorded area 20. In FIG. 4, the dark current component of the signal s is illustrated using hatching. Although it is unknown, it is the same for both temperatures $T_{BB}$.

In the subsequent method step 24, the gradients $σ_1$ and $σ_2$ of the signals s are determined as a function of the integration time t. In FIG. 4, the gradients $σ_{1,2}$ are indicated by double-headed arrows and emerge immediately from a straight line that extends through the two measurement points 22a, 22b and 22c, 22d, respectively, for one temperature $T_{BB}$. In the case of an ideal extent of the two lines, these intersect at a vanishing integration time, t=0, and mark the signal offset ω of the signal s. In FIG. 4, the latter is illustrated by the horizontal dashed line. The signal offset ω for the detector element is calculated accordingly in method step 26. Since reality deviates from the ideal case illustrated in FIG. 4, it is expedient to choose the mean value of the two signal offsets ω that emerge from the points of intersection of the gradient lines through the measurement points 22 with a line for t=0.

Now, the signal offset ω can be determined for each detector element and a reference value for the signal offset can be determined therefrom. Then, the characteristic-curve correction factors Ω for the signal offset for each detector element emerge from the differences of the individual signal offsets ω from the reference value. For the further calculations, the signal offset ω can be subtracted from the signal s or the measurement points 22. However, this is optional.

The gain γ for the detector element is determined in the next method step 28. The gain γ depends on the blackbody temperature $T_{BB}$ and emerges from the difference of the two gradients σ, as indicated in FIG. 4 by the double-headed arrow. The gain $\gamma$ can only be determined for the two blackbody temperatures $T_{BB}$, although it can be interpolated or extrapolated for further blackbody temperatures $T_{BB}$ as characteristic-curve correction factor $\Gamma$. The characteristic-curve correction factors $\Gamma$ for the gain are stored linearly in relation to the blackbody temperatures $T_{BB}$, for example, and so the corrections for any other blackbody temperature $T_{BB}$ can be calculated therefrom. Any other function f can also be chosen in place of the linearization. The problem here is that although the photon flux $\Phi(T_{BB})$ has a theoretical dependence on the blackbody temperature $T_{BB}$, other spectral sensitivities, the nature of the semiconductor quantum heads, details of the ND conversion, etc., are included in the overall detector response, and so there is no simple model for the function f. All that is certain is the monotonic property in $T_{BB}$. Although the function could be measured in the laboratory, this is not necessary for determining the characteristic-curve correction factors, since the factors $f_1$: $=f(\Phi(T_{BB1}))$ and $f_2$: $=f(\Phi(T_{BB2}))$ are unknown but globally the same for all detector elements.

The dark current $\theta$ for the individual pixels is determined in a further method step 30 and characteristic-curve correction factors $\Theta$ for the dark current can be determined therefrom with knowledge about all values for the dark current $\theta$. In relation to the gradients $\sigma$, the dark current $\theta$ adopts the role of an offset. It can be subtracted as a gradient constant, and so the following arises: $\sigma^{(1)}=\sigma-\theta$. $\sigma^{(1)}$ is the first correction to the gradient $\sigma$ in this case. Here, the absolute gradient of the dark current $\theta$ need not be known and can be set to a value, for example the gradient $\sigma_1$ at the lower blackbody temperature $T_{BB1}$, or the mean gradient value of the two gradients $\sigma_1$ and $\sigma_2$. This is shown in exemplary fashion in FIG. 5.

Figure 5:
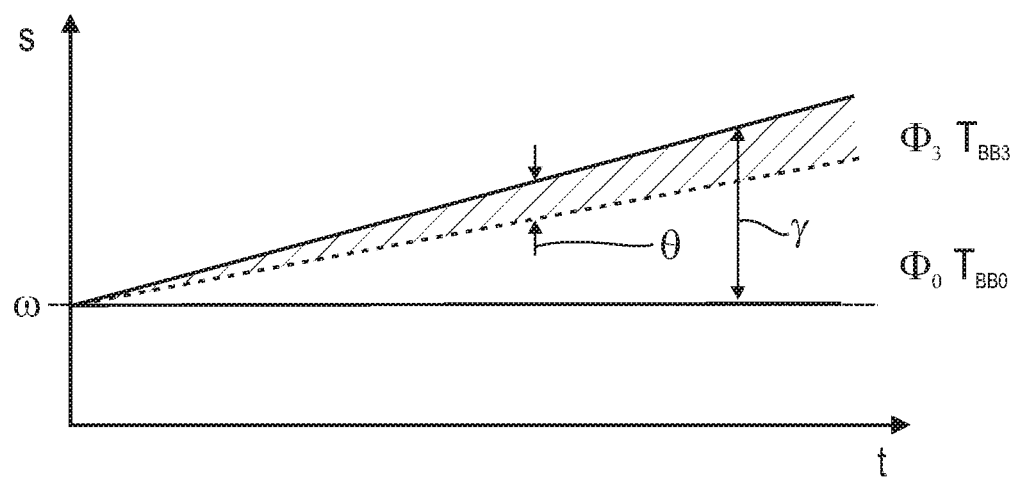
FIG. 5 is a diagram with a computationally changed signal characteristic curve against integration time.

FIG. 5 shows a diagram of a signal s of a detector element of the matrix detector 8, the signal having been modified by calculation. The signal s is plotted against the integration time t and, with its gradient, reproduces the relationship $\sigma^{(1)}=\Gamma-\theta$, where the gradient $\sigma_1$ was assumed as dark current $\theta$. Here, $\gamma$ and $\theta$ remain unchanged in relation to the real measurements from FIG. 4. This calculation is based on the theoretical assumption that two images with different integration times t were recorded at a black body temperature $T_{BB0}$ of 0K. The photon flux $\Phi$ is 0, with the dark current $\theta$ being present, in principle, and arising directly from the gradient $\sigma_0$, such that the dark current $\theta$ is known. The latter can now be subtracted according to the equation $\sigma^{(1)}=\sigma-\theta$, as illustrated in FIG. 5.

Now, the three variables of the signal offset $\omega$, dark current $\theta$ and gain $\gamma$ are known for the corresponding detector element. This procedure can be adopted for a multiplicity of detector elements or for all detector elements. From this, it is possible to determine reference values for the signal offset, dark current and gain, from which the individual characteristic-curve correction factors $\Omega$, $\Theta$ and $\Gamma$ for the signal offset, dark current and gain for each detector element are able to be determined with the individual values.

In order now to arrive at a corrected image with a comparable brightness to the original image, the three variables of signal offset $\Omega$, dark current $\Theta$ and gain $\Gamma$ can be selected in such a way that the corrected signal for each variable is corrected to the mean value of the variable. By way of example, if $\Theta=\sigma(T_{BB1})$ is formulated, a corrected image according to FIG. 5 arises: $\sigma^{(3)}(T_{BB1})=\text{Mean}(\sigma(T_{BB1}))$, which is well corrected as a constant. Thus, the individual gain $\Gamma$ of the detector element is replaced by the mean value. In order now to arrive at the corrected values with the original magnitude corresponding to FIG. 4, albeit with the correction, $\sigma_2=\text{Mean}(\Delta(T_{BB1}, T_{BB2}))+\text{Mean}(\sigma(T_{BB1}))$ applies. Likewise, there can be a linear interpolated and extrapolated correction between the two gradients. Finally, the mean signal offset $\text{Mean}\Omega$ can be added independently of the integration time.

In respect of specific calculations, the characteristic-curve correction factors can be determined as set forth below. Initially, the offset $\omega$ and the gradients $\sigma$ in relation to the integration time t are calculated from the four measurement values 22 $s(t_{1/2}, T_{BB1/2})$ at two different integration times $t_1$ and $t_2$ and two blackbody temperatures $T_{BB1}$ and $T_{BB2}$:

$$\sigma(T_{BB1})=(s(t_2,T_{BB1})-s(t_1,T_{BB1}))/(t_2-t_1)$$

$$\sigma(T_{BB2})=(s(t_2,T_{BB2})-s(t_1,T_{BB2}))/(t_2-t_1)$$

$$\omega(T_{BB1})=s(t_1,T_{BB1})-t_1\sigma(T_{BB1})$$

$$\omega(T_{BB2})=s(t_1,T_{BB2})-t_1\sigma(T_{BB2}).$$

According to the model, $\omega(T_{BB1})=\Omega(T_{BB2})$ should apply; this is usually satisfied to a good approximation. However, the slightly more improved mean value $\omega=(\omega(T_{BB1})+\omega(T_{BB2}))/2$ is used for the corrections. Naturally, this does not apply to the gradients $\sigma$; they depend on the blackbody temperature $T_{BB}$. According to the model, the following applies thereto: $\sigma(T_{BB})=\gamma f(\Phi(T_{BB}))+\theta$.

Now, the individual gain and dark current coefficients $\gamma$ and $\theta$ should be determined therefrom, the coefficients, moreover, being dependent on the detector temperature. By way of example, the matrix detector 8 was cooled to 104 K. Proceeding from the two equations:

$$\sigma(T_{BB1})=\gamma f(\Phi(T_{BB1}))+\theta$$

$$\sigma(T_{BB2})=\gamma f(t(T_{BB2}))+\theta,$$

the difference thereof is calculated to this end:

$$\Delta(T_{BB1},T_{BB2}):=\sigma(T_{BB2})-\sigma(T_{BB1})=\gamma(f(\Phi(T_{BB2})-f(\Phi(T_{BB2})).$$

The dark current component drops out as a result of forming the difference. The multiplicative correction terms $\Gamma$ in gain for the detector elements are then provided individually by $$\Gamma=\text{Mean}(\Delta(T_{BB1},T_{BB2}))/\Delta(T_{BB1},T_{BB2}),$$

Where Mean( . . . ) denotes robust averaging over the entire image and ensures the normalization of the corrections to mean value of 1. The normalization could also be carried out in logarithmic fashion, which takes account of the multiplicative character of the $\Gamma$-correction to a slightly better extent.

Calculating the dark current component $\Theta$ remains to be done, the latter being independent of the scene temperature but subsequently being included in multiplicative fashion with the integration time into the calculation of the characteristic-curve correction factors. The exact extrapolation to $f(\Phi=0)$ or else $f=0$, which in turn would require knowledge of f, is once again not necessary for the correction since one could just as easily take account of a constant offset $f(\Phi)$ the dark current component as well (even if the latter is weighted by $\gamma$, it only needs to be constant). Therefore, even negative values of $\Phi$ are not problematic from a formal point of view. As a reference point for the correction, $$\theta=(\sigma(T_{BB1})+\sigma(T_{BB1}))/2$$

is formulated as mean value of the two gradient images. It would also be possible to use each of the two gradient images; however, the aforementioned approach is symmetrical and supplies slightly better results.

The dark current deviations are corrected by $\Theta$=Mean$(\theta)-\theta$, as a result of which the mean correction is zero.

The sets of coefficients ("images") $\Omega$, $\Gamma$, $\Theta$ are available as a result of the laboratory measurement. Here, the two integration times t and the two detector temperatures $T_{BB}$ chosen for the laboratory measurement are arbitrary in principle, but should be chosen in such a way that, firstly, they cover the typical dynamic range well and, secondly, do not lie in the non-linear range of the detector characteristic curves.

A further parameter is the detector temperature $T_D$, which was not considered previously and was formulated as a constant. In order to be able to carry out a characteristic-curve correction at different detector temperatures, particularly during the cool down, measurements would be accordingly recorded at different detector temperatures $T_D$ and corresponding interpolation coefficients would be stored in the missile 2 such that $$\Omega=\Omega(T_D), \Gamma=\Gamma(T_D), \Theta=\Theta(T_D)$$

are present and are used according to the current detector temperature $T_D$.

Since the offset image $\Omega$ may not be as stable in time as the gain image $\Gamma$, the integration-time-independent offsets need not be stored as they can be calculated dynamically from the double images $s(t_1)$, $s(t_2)$, in a manner analogous to the laboratory measurement:

$$\Omega = s(t_1) - t_1(s(t_2)-s(t_1))/(t_2-t_1).$$

With all three parameter sets being present, the corrected image $s_{corr}$ when applying the characteristic-curve correction to the initial image s, recorded with an integration time t, emerges as In this form, it is very clear that the offset correction is composed of the integration-time-independent $\Omega$ and the dark current integrated over time $t\Theta$. Addition of the mean value images Mean($\Omega$)+t Mean($\Theta$) ensures that the mean value, i.e., Mean(s)=Mean($s_{corr}$), is obtained.

Figure 3:
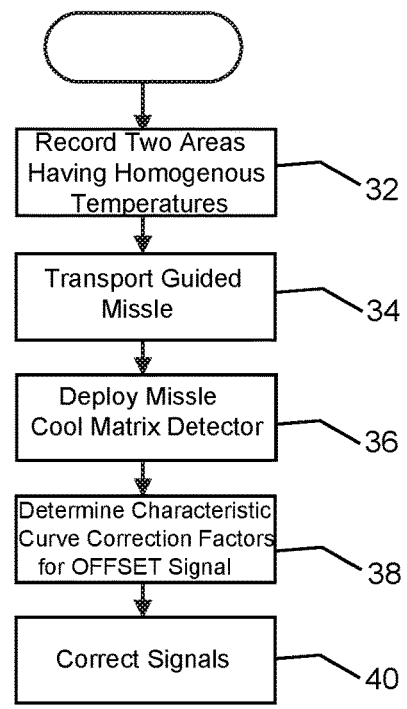
FIG. 3 is a flowchart for correcting signals of detector elements of a matrix detector.

By way of example, the guided missile 2 or any other missile can be controlled on the basis of the characteristic-curve correction factors $\Omega$, $\Gamma$, $\Theta$. Such a method is illustrated in FIG. 3 in exemplary fashion. The characteristic-curve correction factors $\Gamma$, $\Theta$, and optionally $\Omega$ as well, are established in a first method step 32 by virtue of an area 20 that is homogeneous in terms of temperature being imaged onto the matrix detector 8 and the area 20 being recorded at two temperatures, there being two images with different integration times t for each temperature. By way of example, the blackbody temperatures are 25° C. and 65° C. Expediently, this is implemented in a building such that the guided missile 2, the seeker head 4 thereof or only the optical unit 6 with the matrix detector 8 and control unit 10 or an image processing unit, which processes the image data of the matrix detector 8, are in a building. The characteristic-curve correction factors $\Gamma$, $\Theta$, and optionally $\Omega$ as well, are stored in a data memory 16.

In the subsequent method step 34, the guided missile 2 can be transported to a deployment site, or else it is initially transported to a storage site and, from there, to a deployment site at a later time. When the guided missile 2 is deployed 36, the matrix detector 8 is cooled to its deployment temperature, for example to less than 150 Kelvin.

The characteristic-curve correction factors $\Omega$ for the signal offset are established in method step 38 before, during or after the cool down of the matrix detector 8 to its deployment temperature. This is implemented using at least two images that were recorded immediately in succession and from which the gradient $\sigma$, as described above, is established. In this case, the two images are not of an area of homogeneous temperature but may originate from the surrounding scene around or in front of the guided missile 2. Since the signal offset is independent of the integration time and the temperature of the recorded scene, substantially any scene is suitable for calculating the characteristic-curve correction factors $\Omega$ for the signal offset. It is expedient to assign the latter to the detector temperature $T_D$ and optionally carry out the method for two different detector temperatures $T_D$ in order to be able to determine the signal offset even at the deployment temperature of the matrix detector 8 by extrapolation.

Subsequently, the guided missile 2 is launched and the object scene in front of the seeker head 4 of the guided missile 2 is imaged on the matrix detector 8. In method step 40, the signals s of the individual pixels of the matrix detector 8 are corrected on the basis of the characteristic-curve correction factors $\Omega$, $\Gamma$, $\Theta$ and the image obtained from these corrected signals s is analysed by the control unit 10 in respect of controlling the guided missile 2 to a target emitting in the infrared range, for example. Here, the characteristic-curve correction factors $\Omega$, $\Gamma$, $\Theta$ are available in the data memory 16, either as a function depending on the detector temperature $T_D$ or as a multi-dimensional dataset, by means of which the characteristic-curve correction factors $\Omega$, $\Gamma$, $\Theta$ can be calculated by interpolation to the real detector temperature.

The following is a summary list of reference numerals and the corresponding structure used in the above description of the invention:

2 Guided missile
4 Seeker head
6 Optical unit
8 Matrix detector
10 Control unit
12 Fin
14 Active body
16 Data memory
18 Record images
20 Area
22a-d Measurement points
24 Calculate $\sigma$
26 Calculate $\Omega$
28 Calculate $\Gamma$
30 Calculate $\Theta$
32 Establish characteristic-curve correction factors
34 Transport to a deployment location
36 Cooling of the matrix detector
38 Determine $\Omega$
40 Correct the signals
s Signal
t Integration time
T Temperature
$\Phi$ Photon flux
$\gamma$ Gain of a detector element determined from measured values
$\Gamma$ Characteristic-curve correction factors for the gain
$\theta$ Dark current of a detector element determined from measured values
$\Theta$ Characteristic-curve correction factors for the dark current
$\omega$ Signal offset of a detector element determined from measured values
$\Omega$ Characteristic-curve correction factors for the signal offset
$\sigma$ Gradient

The invention claimed is:

1. A method for determining characteristic-curve correction factors of a matrix detector that images in an infrared spectral range, which comprises the steps of:
recording an area having a homogeneous temperature at two different temperatures by the matrix detector, there being two images with different integration times for each temperature;
determining a signal gradient over an integration time for each pixel from four pixel values at the two different temperatures in each case;
determining a gain from a difference of signal gradients by determining a signal offset for each of the pixels from at least two pixel values being assigned to one of the temperatures, the signal offset being subtracted from the pixel values and the gain being thereupon determined; and
storing the characteristic-curve correction factors for the gain.

2. The method according to claim 1, wherein the characteristic-curve correction factors for the gain are determined while the matrix detector is in a building and the characteristic-curve correction factors for the signal offset are determined during a subsequent use of a guided missile that contains the matrix detector.

3. The method according to claim 1, which further comprises recording the two images with the different integration times immediately in succession.

4. The method according to claim 1, which further comprises determining a dark current for each of the pixels using at least image points assigned to one of the temperatures and characteristics of detector elements assigned to the pixels are corrected using the characteristic-curve correction factors for the dark current.

5. The method according to claim 1, which further comprises using the difference between the two signal gradients as the gain.

6. The method according to claim 1, wherein the characteristic-curve correction factor for the gain is a mean difference of the signal gradients divided by a pixel-individual difference of the signal gradients.

7. The method according to claim 1, which further comprises determining the signal offset from the pixel values at both recording temperatures and the characteristic-curve correction factor for the signal offset of the pixels is determined as a mean value of the two signal offsets.

8. The method according to claim 1, which further comprises interpolating the characteristic-curve correction factors from the two temperatures for a multiplicity of further, different temperatures.

9. A method for determining characteristic-curve correction factors of a matrix detector that images in an infrared spectral range, which comprises the steps of:
recording an area having a homogeneous temperature at two different temperatures by the matrix detector, there being two images with different integration times for each temperature;
determining a signal gradient over an integration time for each pixel from four pixel values at the two different temperatures in each case;
determining a dark current for each of the pixels using at least image points assigned to one of the temperatures and characteristics of detector elements assigned to the pixels are corrected using the characteristic-curve correction factors for the dark current, and using one of the signal gradients or a summation of both of the signal gradients as the dark current;
determining a gain from a difference of signal gradients; and
storing the characteristic-curve correction factors for the gain.

10. A method for determining characteristic-curve correction factors of a matrix detector that images in an infrared spectral range, which comprises the steps of:
recording an area having a homogeneous temperature at two different temperatures by the matrix detector, there being two images with different integration times for each temperature;
determining a signal gradient over an integration time for each pixel from four pixel values at the two different temperatures in each case;
determining a gain from a difference of signal gradients;
determining a detector temperature of the matrix detector;
determining the characteristic-curve correction factors in dependence on the detector temperature; and
storing the characteristic-curve correction factors for the gain.

11. A method for controlling a guided missile, which comprises the steps of:
determining characteristic-curve correction factors of a matrix detector that images in an infrared spectral range, which includes the sub-steps of:
recording an area having a homogeneous temperature at two different temperatures by the matrix detector, there being two images with different integration times for each temperature;
determining a signal gradient over an integration time for each pixel from four pixel values at the two different temperatures in each case;
determining a gain from a difference of signal gradients by determining a signal offset for each of the pixels from at least two pixel values being assigned to one of the temperatures, the signal offset being subtracted from the pixel values and the gain being thereupon determined; and
storing characteristic-curve correction factors for the gain;
bringing the guided missile, containing the matrix detector in a seeker head, to a deployment site and launched there;
recording surroundings by the matrix detector in two images with different integration times;
determining a signal offset for each of the pixels from the two pixel values and the characteristics of the detector elements that are assigned to the pixels are corrected using the characteristic-curve correction factors for signal offset and gain; and
controlling the guided missile on a basis of the images of the matrix detector that were corrected.

12. The method according to claim 11, wherein the two images are recorded while cooling the matrix detector, which is implemented to establish a readiness of the matrix detector.

13. A guided missile, comprising:
a seeker head containing a matrix detector with detector elements;
a controller for controlling a deployment flight; and
a data memory containing characteristic-curve correction factors for a gain of said detector elements of said matrix detector, the characteristic-curve correction factors of said matrix detector being determined by the steps of:
recording an area having a homogeneous temperature at two different temperatures with said matrix detector, there being two images with different integration times for each temperature;

determining a signal gradient over an integration time for each pixel from four pixel values at the two different temperatures in each case;

determining the gain from a difference of signal gradients by determining a signal offset for each of the pixels from at least two pixel values being assigned to one of the temperatures, the signal offset being subtracted from the pixel values and the gain being thereupon determined; and storing the characteristic-curve correction factors for the gain.

14. The guided missile according to claim 13, wherein said controller is prepared to determine the characteristic-curve correction factors for a signal offset of said detector elements of said matrix detector on a basis of two scene images with different integration times recorded directly in succession during a deployment.

* * * * *